(12) United States Patent
Okawa et al.

(10) Patent No.: US 10,018,527 B2
(45) Date of Patent: Jul. 10, 2018

(54) SENSOR PACKAGE

(71) Applicant: ALPS ELECTRIC CO., LTD., Ota-ku, Tokyo (JP)

(72) Inventors: Hisanobu Okawa, Tokyo (JP); Kazushige Sejimo, Tokyo (JP); Chiaki Kera, Tokyo (JP); Shigeaki Yamauchi, Tokyo (JP)

(73) Assignee: ALPS ELECTRIC CO., LTD., Tokyo (JP)

(*) Notice: Subject to any disclaimer, the term of this patent is extended or adjusted under 35 U.S.C. 154(b) by 182 days.

(21) Appl. No.: 15/212,505

(22) Filed: Jul. 18, 2016

(65) Prior Publication Data

US 2017/0030789 A1 Feb. 2, 2017

(30) Foreign Application Priority Data

Jul. 30, 2015 (JP) ................. 2015-150410

(51) Int. Cl.
| | |
|---|---|
| *G01L 9/00* | (2006.01) |
| *G01L 19/04* | (2006.01) |
| *G01L 19/14* | (2006.01) |
| *G01L 19/00* | (2006.01) |
| *G01L 9/02* | (2006.01) |
| *G01L 9/12* | (2006.01) |

(52) U.S. Cl.
CPC ........ *G01L 19/0084* (2013.01); *G01L 9/0051* (2013.01); *G01L 9/0072* (2013.01); *G01L 9/025* (2013.01); *G01L 9/125* (2013.01); *G01L 19/0038* (2013.01); *G01L 19/04* (2013.01); *G01L 19/143* (2013.01)

(58) Field of Classification Search
CPC ....... G01L 9/00; G01L 19/00; G01L 19/0038; G01L 19/0084; G01L 19/04; G01L 19/14; G01L 19/143
See application file for complete search history.

(56) References Cited

U.S. PATENT DOCUMENTS

| | | | |
|---|---|---|---|
| 7,043,993 B2 | 5/2006 | Hayashi et al. | |
| 9,046,428 B2* | 6/2015 | Habibi | ............. G01L 9/0073 |
| 9,261,425 B2* | 2/2016 | Fahimi | ............. G01L 19/0069 |
| 2009/0314096 A1 | 12/2009 | Colombo | |
| 2011/0138921 A1 | 6/2011 | Columbo et al. | |
| 2015/0377734 A1* | 12/2015 | Ihle | ............. G01L 19/04 |
| | | | 73/706 |

FOREIGN PATENT DOCUMENTS

JP  3890739  12/2006

* cited by examiner

*Primary Examiner* — Nguyen Ha
(74) *Attorney, Agent, or Firm* — Hunton Andrews Kurth LLP (57) ABSTRACT

A sensor package includes a pressure sensor, a computation unit that performs specified computation in accordance with a result of detection performed by the pressure sensor, a lead frame through which a result of computation performed by the computation unit is output to an outside, a main housing that is formed of resin and that holds the lead frame, and a sensor housing that is formed of ceramic and that has an inner space in which the pressure sensor is disposed. The pressure sensor is disposed in the main housing using the sensor housing.

10 Claims, 11 Drawing Sheets

SENSOR PACKAGE

CLAIM OF PRIORITY

This application contains subject matter related to and claims the benefit of Japanese Patent Application No. 2015-150410 filed on Jul. 30, 2015, the entire contents of which is incorporated herein by reference.

BACKGROUND OF THE DISCLOSURE

1. Field of the Disclosure

The present disclosure relates to a sensor package used for detecting pressure in automobiles, industrial machines, and so forth.

2. Description of the Related Art

A temperature sensor-integrated pressure sensor device described in Japanese Patent No. 3870918 includes a pressure sensor element, a lead frame electrically connected to this pressure sensor element, a connector pin electrically connected to this lead frame, and a pressure introduction hole through which a medium the pressure of which is to be measured is introduced. The pressure sensor element and the lead frame are enclosed by mold resin.

A semiconductor pressure sensor device described in Japanese Patent No. 3890739 includes a semiconductor pressure sensor chip, a resin package into which a conductive portion is insert molded, a first protective member, and a second protective member. The semiconductor pressure sensor chip is electrically connected to the conductive portion by a bonding wire. The first protective member is formed of a resin or rubber material having a comparatively high Young's modulus. At least the conductive portion, a region around the conductive portion, and a mount portion for mounting the semiconductor pressure sensor chip on the resin package is covered with the first protective member with a sensing portion of the semiconductor pressure sensor chip exposed. The second protective member is a gel or gel-like substance having a comparatively low Young's modulus and covers the sensing portion of the semiconductor pressure sensor chip and the first protective member. The bonding wire is covered with the first protective member and the second protective member.

In the pressure sensor device according to Japanese Patent No. 3870918 or Japanese Patent No. 3890739, the lead frame or the conductive portion is covered with resin. With such a structure, when contact between the lead frame or the conductive portion and the resin is not sufficiently tight, a small amount of air may remain in a gap or at an interface between the lead frame or the conductive portion and the resin while the resin is formed. Such residual air may leak as air bubbles through the gap or the interface due to a variation in pressure during detection. This may degrade accuracy of pressure detection. Furthermore, the gap between the lead frame or the conductive portion and the resin may become an air leakage path from the outside to the inside of the pressure sensor device. This degrades the accuracy of pressure detection.

In order address this, for the pressure sensor device described in Japanese Patent No. 3890739, the following structure is proposed: resin that covers the lead frame or the conductive portion has a high Young's modulus, thereby reducing the likelihood of air remaining in the gap or the interface between the lead frame or the conductive portion and the resin.

However, in the case where the resin that covers the lead frame or the conductive portion is in contact with a pressure sensor that detects pressure, when the temperature of the resin varies due to a variation in temperature of a region around a device or a variation in temperature of the lead frame, accuracy of temperature characteristics of the pressure sensor may be degraded because the pressure sensor in contact with the resin is also affected by a surrounding environment. Furthermore, in many cases a resin having a high Young's modulus has high stress while hardening. In order to suppress a variation in output of the pressure sensor due to such stress, it is preferable that a material having low stress while hardening be selected. Thus, selectable materials are limited, and accordingly, reduction of cost is difficult.

Furthermore, in the case where the sensor that senses the pressure and the lead frame or the conductive portion are integrated with each other with common resin which is part of either or both of a pressure chamber and the pressure introduction hole as is the case with the pressure sensor device according to Japanese Patent No. 3870918 or 3890739, it is required that the entirety of the pressure sensor device be attached to a calibration device for calibrating the pressure sensor. Thus, it is required that a large and complex calibration device be prepared. Accordingly, a large capital investment is required.

Furthermore, in the case where an integrated circuit (IC) board that includes a computation unit and the like that perform computation in accordance with a result of detection performed by the pressure sensor, it is required that the IC board and an element and the like connected to the IC board be covered by a highly insulative resin so as to prevent electrostatic damage. Here, when the pressure sensor is connected to the IC board through the bonding wire, the resin that covers the IC board is required to be soft so that the resin does not obstruct operation of the pressure sensor. In contrast, as described above, from the viewpoint of prevention of remaining of the air, it is preferable that the resin that covers the lead frame or the conductive portion be hard. Thus, required characteristics are different between the resin that covers the lead frame or the conductive portion and the resin that covers the IC board. Accordingly, it is required that the lead frame or the conductive portion and the IC board be disposed in respective different spaces and covered by different types of resin. This leads to a problem in that a routing pattern of the lead frame or the conductive portion and the structure around the routing pattern become complex.

These and other drawbacks exist.

SUMMARY

Embodiments of the present disclosure provide a sensor package with which degradation of accuracy of temperature characteristics and accuracy of pressure detection due to effects of a surrounding environment can be suppressed, for which no large and complex calibration device is required, and with which the structure of a lead frame or a region around the lead frame does not become complex.

According to an example embodiment, a sensor package includes a pressure sensor, a computation unit that performs specified computation in accordance with a result of detection performed by the pressure sensor, a lead frame through which a result of computation performed by the computation unit is output to an outside, a main housing that is formed of resin and that holds the lead frame, and a sensor housing that is formed of ceramic and that has an inner space in which the pressure sensor is disposed. The pressure sensor is disposed in the main housing using the sensor housing.

With the pressure sensor and the lead frame separately housed in the sensor housing and the main housing, respectively, temperature variations of a region around a device and the lead frame are unlikely to affect the pressure sensor. Thus, reduction of accuracy of temperature characteristics of the pressure sensor can be suppressed. Furthermore, since effects of air remaining in a gap and an interface between the lead frame and the resin of the main housing are blocked by the sensor housing, accuracy of pressure detection of the pressure sensor can be maintained. Furthermore, calibration of the pressure sensor can be performed by detaching only the sensor housing from the sensor package. Thus, an increase in the size of the calibration device can be prevented.

In such an embodiment, the sensor package further includes an integrated circuit board that includes the computation unit and that is disposed in the inner space of the sensor housing.

Thus, calibration can be performed only with the sensor housing, and accordingly, the increase in the size of the calibration device can be prevented.

Also, the integrated circuit board and the lead frame are electrically connected to each other through a connection disposed in a hole that penetrates through the sensor housing.

Thus, need of a bonding wire or the like used for a connecting structure between the sensor housing and the lead frame is dropped, and accordingly, the connecting structure can be simplified.

Additionally, at least part of the sensor housing is disposed on the lead frame.

This allows the connecting structure between the sensor housing and the lead frame to be simplified and reduced in size.

The sensor package may include, instead of the integrated circuit board disposed in the inner space of the sensor housing, an integrated circuit board that includes the computation unit and that is disposed at a position which is outside the sensor housing and in the main housing.

This allows the size of the sensor package to be reduced, and accordingly, the increase in the size of the calibration device can be prevented.

In the case where the integrated circuit board that includes the computation unit is disposed at the position which is outside the sensor housing and in the main housing, in the sensor package, the main housing has one surface having a recess, another surface facing the one surface, and a through hole that penetrates from the other surface to the recess. Also in this sensor package, the sensor housing covers a region where the through hole is connected to the recess, and the through hole and the inner space of the sensor housing communicate with each other so as to form a space closed to the recess. Also in this sensor package, the integrated circuit board is disposed at a position which is in the recess and outside the sensor housing.

Thus, the integrated circuit board is disposed outside the sensor housing, and accordingly, the size of the sensor housing can be further reduced. This can increase flexibility with which the sensor housing and the integrated circuit board are disposed can be increased. Furthermore, even when a fluid as an object to be measured has electrification characteristics, due to disposition of the integrated circuit board outside the sensor housing, there is no accumulation of charge on the surface of the integrated circuit board through a pressure transmission medium. Thus, electrostatic damage to the integrated circuit board can be suppressed.

In the case where the integrated circuit board that includes the computation unit is disposed at the position which is outside the sensor housing and in the main housing, in the sensor package, the through hole and the inner space are preferably filled with a pressure transmission medium, and the pressure sensor disposed in the inner space is covered with the pressure transmission medium. Also in this sensor package, the recess is filled with a resin having a higher Young's modulus than a Young's modulus of the pressure transmission medium, and the integrated circuit board is covered with the resin having the higher Young's modulus than a Young's modulus of the pressure transmission medium.

Thus, the air in the gap and the interface between the main housing and the lead frame is unlikely to expand. This can prevent a variation in pressure in the pressure transmission medium, and accordingly, the accuracy of pressure detection is reliably obtained.

In the case where the integrated circuit board that includes the computation unit is disposed at the position which is outside the sensor housing and in the main housing, the sensor package further includes a metal wire that connects the integrated circuit board and a pad provided on a lower surface of the sensor housing to each other. This integrated circuit board and the pressure sensor are electrically connected to each other through the metal wire, and the metal wire is preferably covered with the resin having the higher Young's modulus than the Young's modulus of the pressure transmission medium.

In the above-described structure, the metal wire that electrically connects the integrated circuit board and the pressure sensor to each other is not on a path through which pressure is transmitted and is covered with resin having a high Young's modulus. Thus, there is no possibility of breakage of the metal wire due to stress caused by transmission of the pressure by the pressure transmission medium, and accordingly, reliability of electrical connection can be improved.

In the case where the integrated circuit board that includes the computation unit is disposed at the position which is outside the sensor housing and in the main housing, the pressure sensor and the pad on the lower surface of the sensor housing are preferably electrically connected to each other through a connection disposed in a hole that penetrates through the sensor housing.

This allows the size of the sensor housing to be reduced, and accordingly, the increase in the size of the calibration device can be prevented.

In the case where the integrated circuit board that includes the computation unit is disposed in the inner space of the sensor housing, the sensor package further includes a material that has a lower Young's modulus than a Young's modulus of the sensor housing and that is disposed between the main housing and the sensor housing.

Thus, variations in temperature around the device and the lead frame are unlikely to be transmitted to the pressure sensor. This can maintain the accuracy of temperature characteristics of the pressure sensor at a high level.

According to various embodiments of the present disclosure, the sensor package can be provided with which the degradation of the accuracy of temperature characteristics and the accuracy of pressure detection due to the effects of the surrounding environment can be suppressed, for which no large and complex calibration device is required, and with which the structure of the lead frame or the region around the lead frame does not become complex.

DETAILED DESCRIPTION OF THE DISCLOSURE

A sensor package according to embodiments of the present invention will be described in detail below with reference to the drawings. The following description is intended to convey a thorough understanding of the embodiments described by providing a number of specific embodiments and details involving a sensor package. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending on specific design and other needs.

Figure 1:
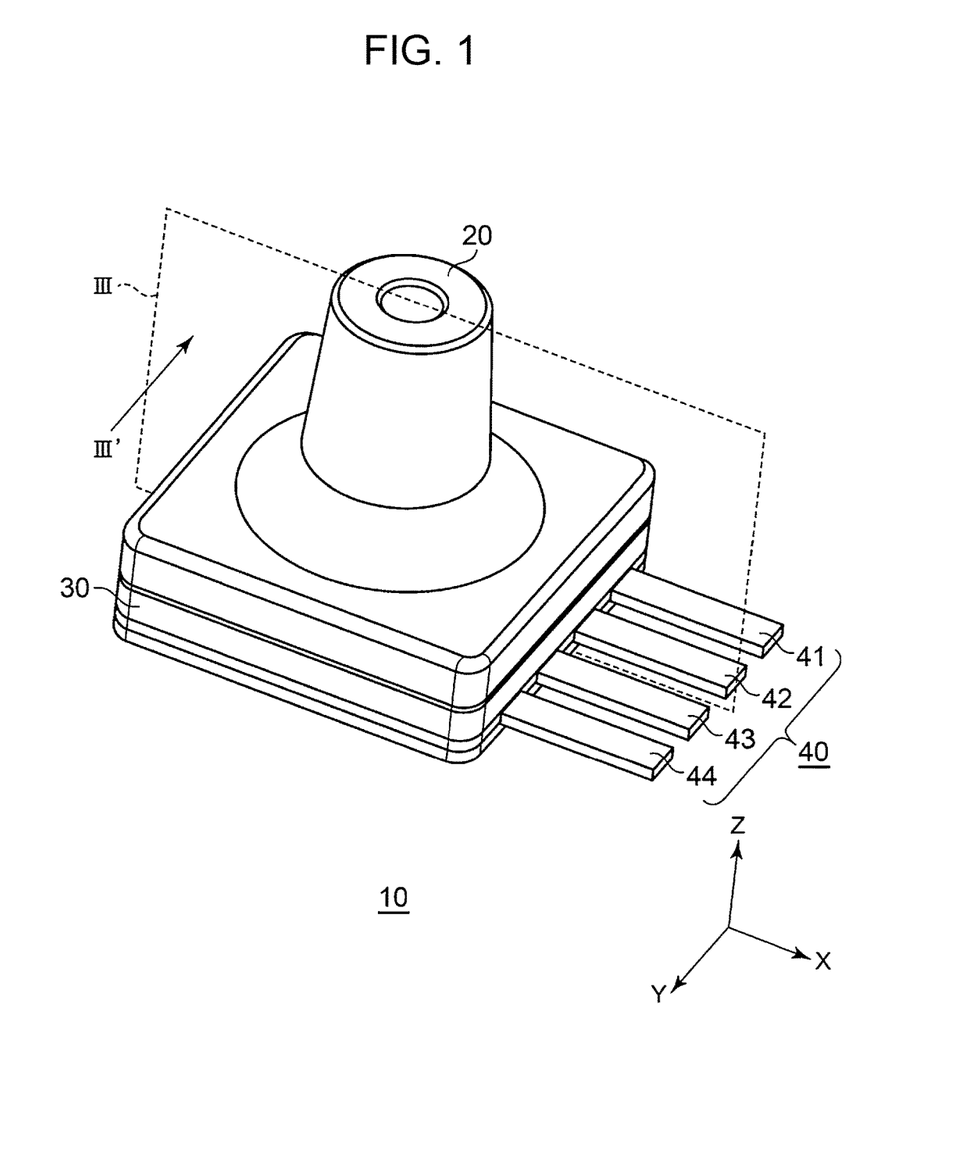
FIG. 1 is a perspective view of a structure of a sensor package according to an example embodiment.
Figure 2:
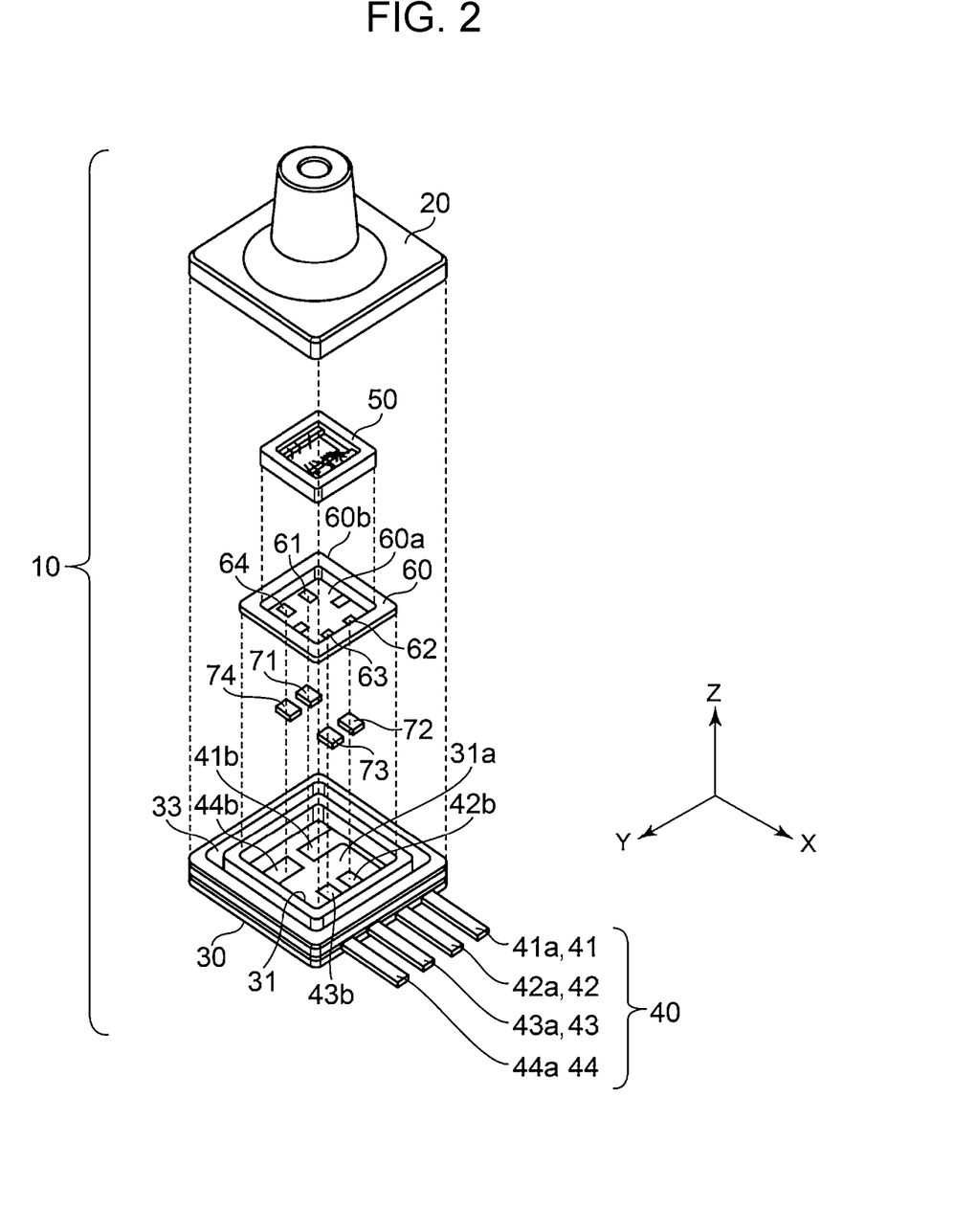
FIG. 2 is an exploded perspective view of the structure of the sensor package according to an example embodiment.
Figure 3:
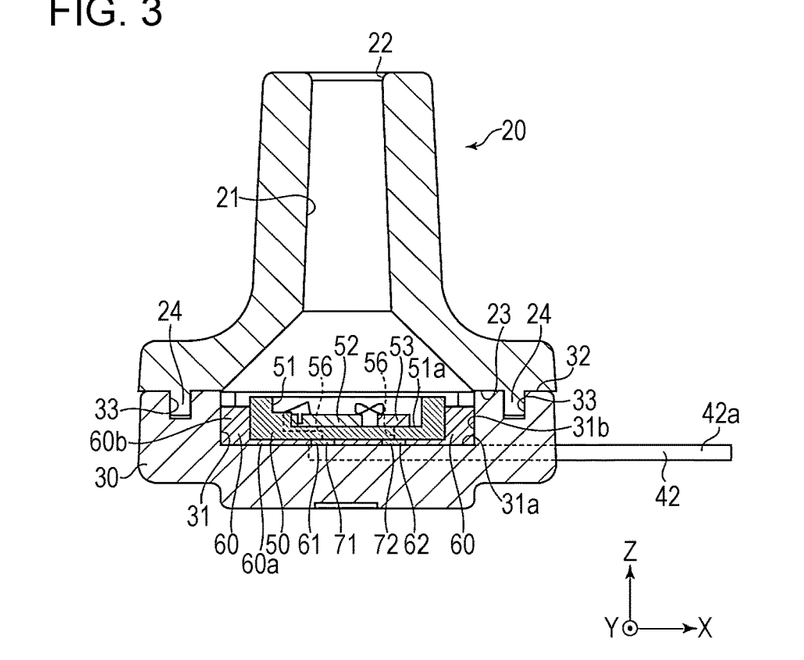
FIG. 3 is a sectional view of the structure of the sensor package according to an example embodiment.

FIG. 1 is a perspective view of a structure of a sensor package 10 according to an example embodiment of the disclosure. FIG. 2 is an exploded perspective view of the structure of the sensor package 10. FIG. 3 is a sectional view of the structure of the sensor package 10 taken along plane III of FIG. 1 and seen in an arrow III' direction of FIG. 1 along the Y direction. In each of the drawings, X-Y-Z coordinates are indicated as reference coordinates. The X-Y plane is perpendicular to the Z direction, and in description hereafter, the Z direction may be referred to as an upward direction and a view seen from the upper side in the Z direction may be referred to as a plan view.

As illustrated in FIG. 1 or 2, the sensor package 10 may include a nozzle 20, a main housing 30, a lead frame 40 that extends outward from the main housing 30, and a sensor housing 50. As illustrated in FIG. 2, an underfill 60 may be disposed between the sensor housing 50 and the main housing 30. Also, electrically conductive members 71, 72, 73, and 74 may be disposed between the sensor housing 50 and the main housing 30.

The nozzle 20 may be formed of, for example, polyacetal (POM) or Polyphenylenesulfid (PPS) and may extend from the main housing 30 in the upward direction (Z direction). As illustrated in FIG. 3, the nozzle 20 may have a pressure introduction hole 21 therein. An opening 22 may be provided on an upper portion of the pressure introduction hole 21. An inner diameter of the pressure introduction hole 21 increases toward the lower side. The nozzle 20 may have a lower surface 23 from which a fitting projection 24 projects downward.

The main housing 30 may be formed of a material that is the same as or similar to the material of the nozzle 20, that is, formed of, for example, POM or PPS and has a substantially rectangular shape in plan view. The main housing 30 may have a cavity 31 at its central portion in the XY plane. The cavity 31 may be recessed inward so as to receive the sensor housing 50 therein. Furthermore, the main housing 30 has an upper surface 32 which has a fitting recess 33 recessed downward at a position that surrounds a region outside the cavity 31 in the XY plane and that corresponds to the fitting projection 24 of the nozzle 20. The fitting recess 33 may have a shape corresponding to that of the fitting projection 24 of the nozzle 20. Thus, the fitting projection 24 may be fitted into the fitting recess 33 so as to couple the nozzle 20 and the main housing 30 to each other. This forms a space in which the pressure introduction hole 21 of the nozzle 20 and the cavity 31 of the main housing 30 communicate with each other.

The lead frame 40 may include four leads 41, 42, 43, and 44 and may be formed by insert molding so as to be disposed at respective specified positions of the main housing 30. As illustrated in FIG. 2, the leads 41, 42, 43, and 44 have respective first end portions 41a, 42a, 43a, and 44a that extend outward from the main housing 30. The leads 41, 42, 43, and 44 respectively have second end portions 41b, 42b, 43b, and 44b and may be routed in the cavity 31, so that the second end portions 41b, 42b, 43b, and 44b are disposed at positions respectively correspond to second pads 57a, 57b, 57c, and 57d (FIG. 5) on a lower surface 50b of the sensor housing 50. Upper surfaces of the second end portions 41b, 42b, 43b, and 44b may be exposed in the cavity 31. The leads 41, 42, 43, and 44 each may include, for example, a copper base material the surface of which is gold-plated.

Figure 4:
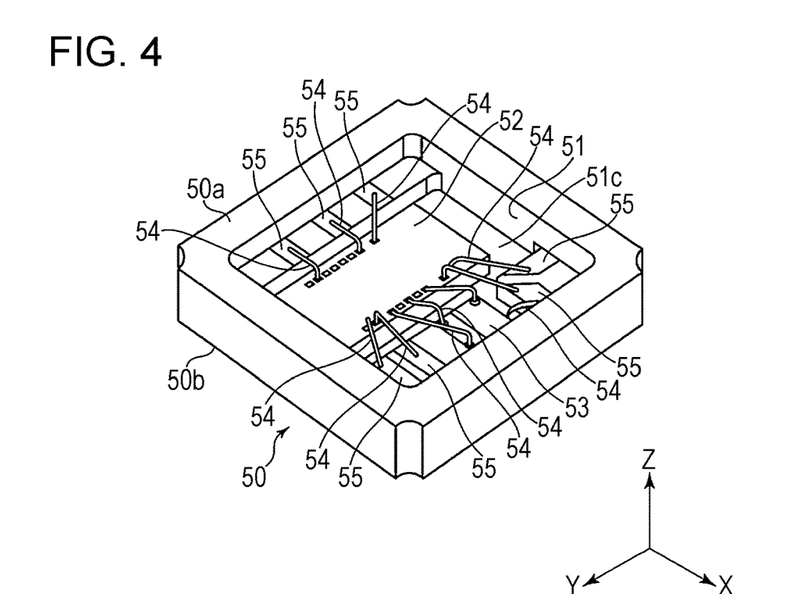
FIG. 4 is a perspective view of a structure of a sensor housing according to an example embodiment seen from an upper surface side.
Figure 5:
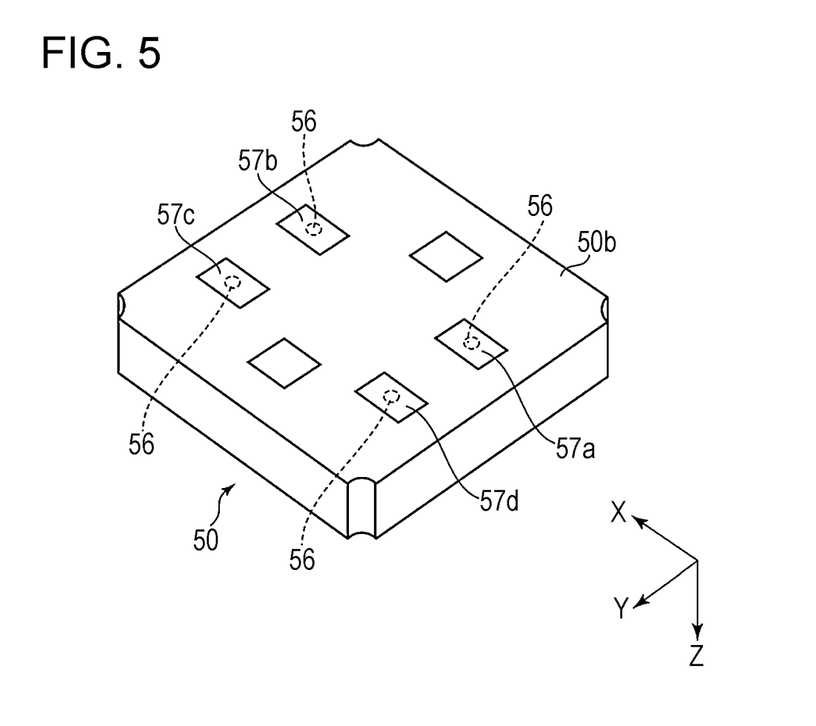
FIG. 5 is a perspective view of the structure of the sensor housing according to an example embodiment seen from a lower surface side.

FIG. 4 is a perspective view of a structure of the sensor housing 50 seen from an upper surface 50a side. FIG. 5 is a perspective view of the structure of the sensor housing 50 seen from the lower surface 50b side.

As illustrated in FIG. 4, the sensor housing 50 may have a substantially rectangular shape in plan view and has an inner space 51 recessed inward at its central portion in the XY plane. A pressure sensor 53 may be disposed in this inner space 51. Also, an integrated circuit (IC) board 52 may be also disposed in this inner space 51. The IC board 52 and the pressure sensor 53 may be secured by a die bonding resin to a lower surface 51a that defines a lower end of the inner space 51. The IC board 52 and the pressure sensor 53 may be electrically connected each other through metal bonding wires (metal wires), so that a detection signal of the pressure sensor 53 is output to the IC board 52.

The sensor housing 50 may be formed of an insulating material having a Young's modulus and a melting point that are higher than those of the main housing 30, an adhesive by which the main housing 30 and the underfill 60 may be bonded to each other, and an adhesive by which the sensor housing 50 and the underfill 60 may be bonded to each other. The melting point of the sensor housing 50 may be higher than that of the underfill 60, and the Young's modulus of the sensor housing 50 is preferably higher than that of the underfill 60. The sensor housing 50 may be formed of ceramic, for example, sintered compact of aluminum oxide or glass.

The IC board 52 may include a computation unit that performs computation to create data for digital output in accordance with current or voltage as a result of detection output from the pressure sensor 53. The IC board 52 also may include a temperature sensor and a memory (not illustrated). In accordance with a result of detection performed by this temperature sensor, the IC board 52 corrects the result of detection performed by the pressure sensor 53 using a correction table stored in the memory in advance.

The pressure sensor 53 may be, for example, a diaphragm gauge and detects a pressure applied to the diaphragm in accordance with a variation in the capacitance or by using a strain gauge. When the main housing 30 and the nozzle 20 are coupled to each other, the inner space 51 where the pressure sensor 53 is disposed forms a space communicating with the pressure introduction hole 21 of the nozzle 20. This space is filled with fluorocarbon gel serving as a pressure transmission medium by, for example, potting. When the pressure of the gel in the pressure introduction hole 21 varies, the pressure applied to the diaphragm of the pressure sensor 53 varies. Thus, a pressure of, for example, a liquid in a tube connected to the nozzle 20 can be detected by detecting the pressure of the gel in the pressure introduction hole 21.

A plurality of first pads 55 formed of an electrically conductive material (for example, gold) may be provided in the inner space 51 of the sensor housing 50. The first pads 55 may be electrically connected to the IC board 52 by the bonding wires 54. The second pads 57a, 57b, 57c, and 57d formed of an electrically conductive material (for example, gold) may be, as illustrated in FIG. 5, provided on the lower surface 50b of the sensor housing 50. Furthermore, the sensor housing 50 may have a plurality of through holes 56 (holes; FIGS. 3 and 5) that penetrate therethrough in the thickness direction (Z direction) and are filled with an electrically conductive material (for example, tungsten or molybdenum), thereby conductive paths are formed. These conductive paths allow the second pads 57a, 57b, 57c, and 57d provided on the lower surface 50b of the sensor housing 50 and the corresponding first pads 55 in the inner space 51 to be electrically connected to one another, respectively.

The sensor housing 50 may be disposed in the cavity 31 of the main housing 30 with the underfill 60 interposed therebetween. The underfill 60 may be formed of resin, for example, the underfill 60 may be formed of an epoxy resin. A lower surface 60a and side surfaces 60b of the underfill 60 are respectively secured to a lower surface 31a and side surfaces 31b that define a lower end and sides of the cavity 31 by an electrically non-conductive adhesive. For example, an epoxy resin or a fluoroelastomer may be used as this adhesive.

The lower surface 60a of the underfill 60 has holes 61, 62, 63, and 64 penetrating therethrough in the thickness direction. The holes 61, 62, 63, and 64 may be formed at positions corresponding to the second pads 57a, 57b, 57c, and 57d of the sensor housing 50, respectively. When the underfill 60 is disposed in the cavity 31 of the main housing 30, the holes 61, 62, 63, and 64 are positioned above the second end portions 41b, 42b, 43b, and 44b, respectively.

In order to secure the sensor housing 50 in the cavity 31 with the underfill 60 interposed therebetween, initially, the electrically conductive members 71, 72, 73, and 74 are disposed at positions corresponding to the second pads 57a, 57b, 57c, and 57d of the sensor housing 50 on the second end portions 41b, 42b, 43b, and 44b, and a thermosetting adhesive may be disposed in a region of the lower surface 31a that defines the lower end of the cavity 31 other than regions where the electrically conductive members 71, 72, 73, and 74 are disposed. Here, the electrically conductive members 71, 72, 73, and 74 may be formed of, for example, solder or conductive paste.

Next, the sensor housing 50 may be disposed in the cavity 31 of the main housing 30 so that the second pads 57a, 57b, 57c, and 57d of the sensor housing 50 are in contact with the corresponding electrically conductive members 71, 72, 73, and 74. In this state, when the electrically conductive members 71, 72, 73, and 74 are heated up to their melting temperature and then cooled, the adhesive is solidified and the electrically conductive members 71, 72, 73, and 74 are melted and solidified. Thus, the leads 41, 42, 43, and 44 and the corresponding second pads 57a, 57b, 57c, and 57d are secured to one another and electrically connected to one another.

Then, the underfill 60 in a liquid state may be poured into a gap between the main housing 30 and the sensor housing 50. Next, the sensor housing 50 in this state may be placed in a closed space and deaerated to a specified pressure so as to perform degassing on the underfill 60 in the liquid state. Furthermore, after the degassing is completed, the sensor package 10 may be heated so as to solidify the underfill 60.

The fitting projection 24 may be fitted into the fitting recess 33 of the main housing 30 to which the sensor housing 50 has been secured with the underfill 60 interposed therebetween as described above. Thus, the nozzle 20 is coupled to the main housing 30 to complete the sensor package 10.

With the above-described structure, the sensor housing 50 may be disposed on the second end portions 41b, 42b, 43b, and 44b, and the IC board 52 and the pressure sensor 53 may be disposed in the cavity 31 without directly contacting the main housing 30. Furthermore, the lead frame 40 may be connected as follows: (1) the lead 41 may be electrically connected to the second pad 57a through the electrically conductive member 71 disposed on the second end portion 41b of the lead 41; (2) the lead 42 may be electrically connected to the second pad 57b through the electrically conductive member 72 disposed on the second end portion 42b of the lead 42; (3) the lead 43 may be electrically connected to the second pad 57c through the electrically conductive member 73 disposed on the second end portion 43b of the lead 43; and (4) the lead 44 may be electrically connected to the second pad 57d through the electrically conductive member 74 disposed on the second end portion 44b of the lead 44. With such connecting relationships, a result of computation performed by the computation unit of the IC board 52 in accordance with the result of detection performed by the pressure sensor 53 may be output to an external device to which the lead frame 40 is connected.

Figure 6:
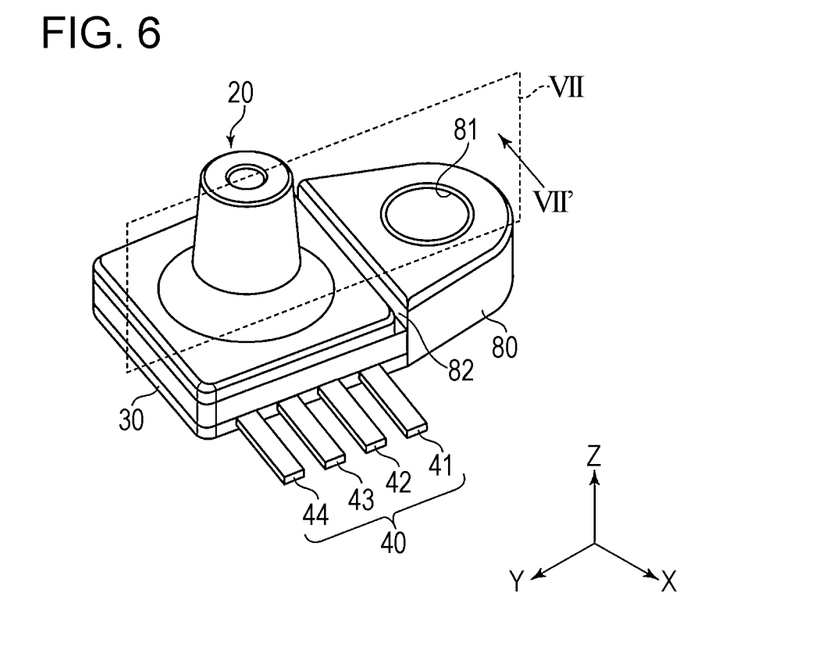
FIG. 6 is a perspective view of a structure in which an attachment is provided for the sensor package according to an example embodiment.
Figure 7:
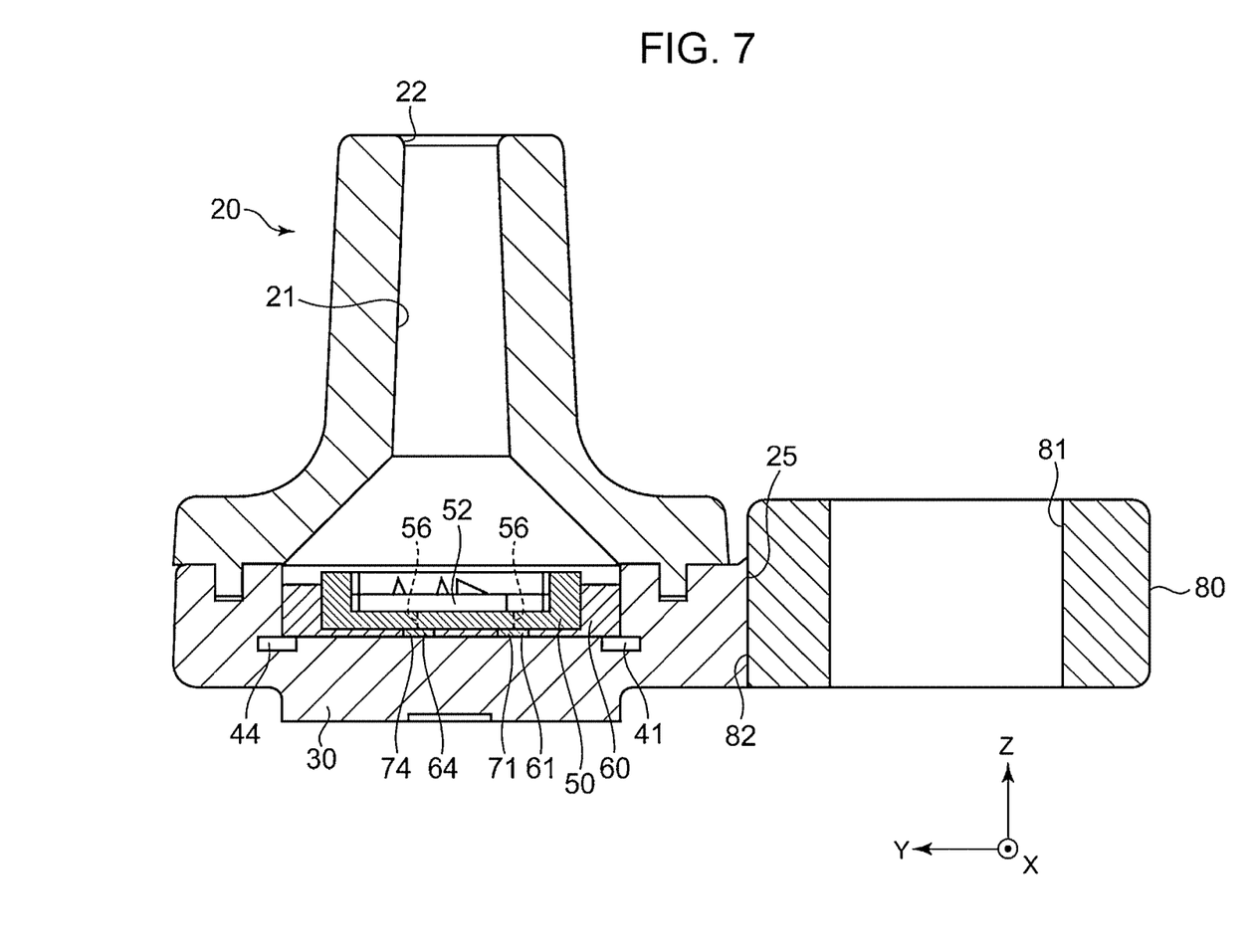
FIG. 7 is a sectional view taken along plane VII of FIG. 6.

FIG. 6 is a perspective view of a structure in which an attachment 80 is provided in the sensor package 10. FIG. 7 is a sectional view taken along plane VII of FIG. 6 and seen in an arrow VII' direction along the X direction of FIG. 6.

There are various methods to secure the sensor package 10 to an external device. Examples of such methods include a method in which the attachment 80 as illustrated in FIG. 6 or 7 is provided. The attachment 80 may be coupled to the main housing 30 by securing an attachment surface 82 of the attachment 80 to a side surface 25 of the nozzle 20. The attachment 80 may have a bolt insertion hole 81 penetrating therethrough in the thickness direction (Z direction). The sensor package 10 can be coupled to the external device by fitting the tip side of a bolt inserted into the bolt insertion hole 81 into a fixing hole provided in the external device.

With the above-described structure, the following effects are obtained.

(1) Since the sensor housing 50 that houses the pressure sensor 53 and the main housing 30 that holds the lead frame 40 may be separately formed, effects caused by variations in temperature of the main housing 30, the lead frame 40, a device, and a region around these components and the device are unlikely to affect the pressure sensor 53 in the inner space 51 of the sensor housing 50. Thus, the accuracy of temperature characteristics of the pressure sensor 53 can be maintained. Furthermore, since effects of air remaining in a gap and at an interface between the lead frame 40 and the resin of the main housing 30 are blocked by the sensor housing 50, accuracy of pressure detection of the pressure sensor 53 can be maintained.

(2) Since the sensor housing 50 that houses the pressure sensor 53 is independent of the main housing 30, only the sensor housing 50 that contains therein the pressure sensor 53 is necessary for calibration of the pressure sensor 53. Thus, there is no possibility that the size of a calibration device is increased and the calibration device becomes complex. This can reduce a capital investment.

(3) The IC board 52 is disposed in the sensor housing 50, and the IC board 52 is electrically connected to the lead frame 40 in the Z direction through the electrically conductive members 71, 72, 73, and 74 with the underfill 60 interposed between the IC board 52 and the lead frame 40. Thus, although electrostatic damage to the IC board 52 is prevented by filling the soft gel in the sensor housing 50 and holding the lead frame 40 by a hard resin so as to suppress formation of air bubbles, neither the shape of the lead frame 40 nor the electrical wiring from the IC board 52 to the lead frame 40 becomes complex.

(4) Since the resin that surrounds the lead frame 40, that is, the resin that forms the main housing 30 has a high Young's modulus, the air in the gap and the interface between the lead frame 40 and the main housing 30 is unlikely to expand. This can prevent a variation in pressure in the pressure transmission medium, and accordingly, the accuracy of pressure detection is reliably obtained.

(5) Variations in temperature around the device and the lead frame 40 are unlikely to be transmitted to the pressure sensor 53 by disposing the adhesives and the underfill 60 formed of resin having a Young's modulus lower than that of the sensor housing 50 between the main housing 30 and the sensor housing 50. This can maintain the accuracy of temperature characteristics of the pressure sensor 53 at a high level.

Although the underfill 60 is disposed between the sensor housing 50 and the main housing 30 in the above-described sensor package 10, the underfill 60 may be omitted, and instead, the sensor housing 50 may be secured to the cavity 31 of the main housing 30 by an electrically non-conductive adhesive. This can allow the sensor package 10 to be produced at a lower cost.

The shapes of the nozzle 20 and the pressure introduction hole 21 are not limited to the above-described shapes and may be any shapes corresponding to the shape of the sensor package 10. The nozzle 20 may be omitted depending on the specification.

The IC board 52 may have the function of the computation unit that performs specified computation in accordance with the result of detection performed by the pressure sensor 53 as described above. The computation unit also may be a single component having a single function or the pressure sensor 53 may have the function of the computation unit.

Next, a further example embodiment is described. A difference between the above-described embodiment and this embodiment is that the IC board may be provided outside the sensor housing according to the following example embodiment.

Figure 8:
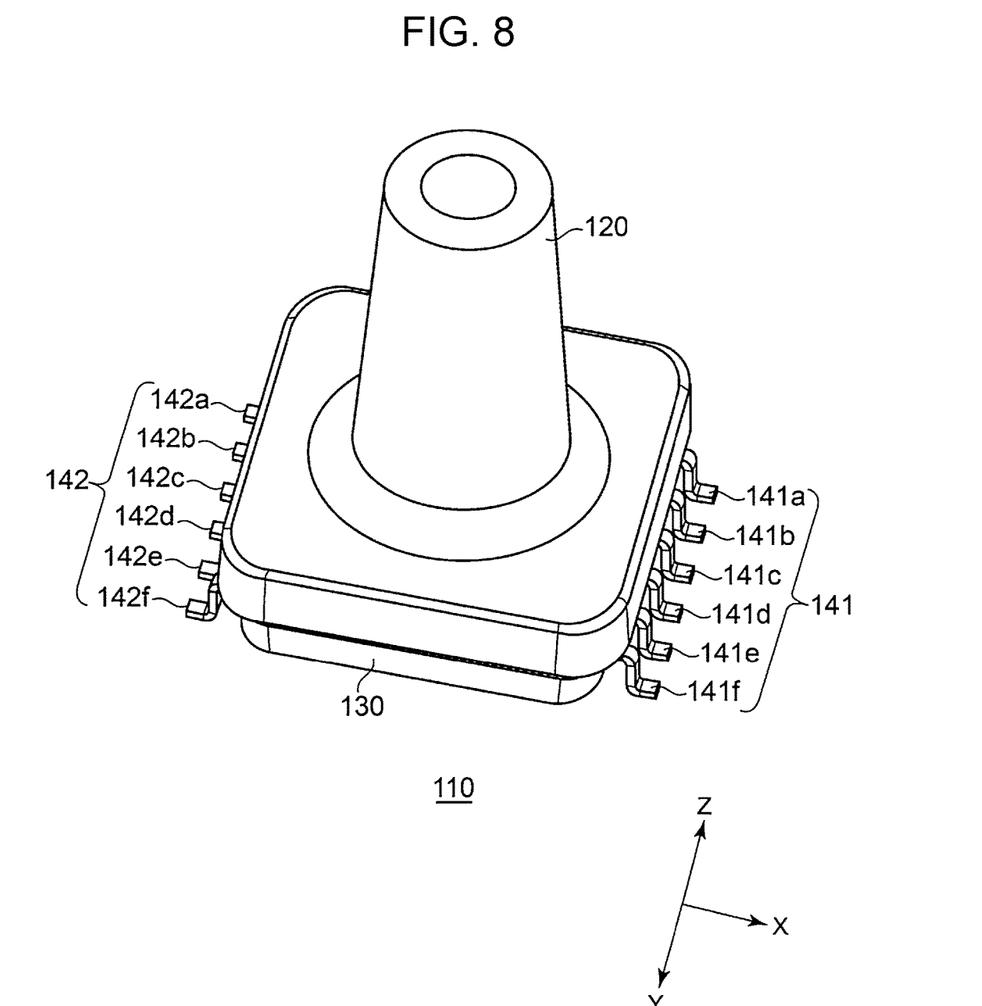
FIG. 8 is a perspective view of a structure of a sensor package according to an example embodiment.
Figure 9:
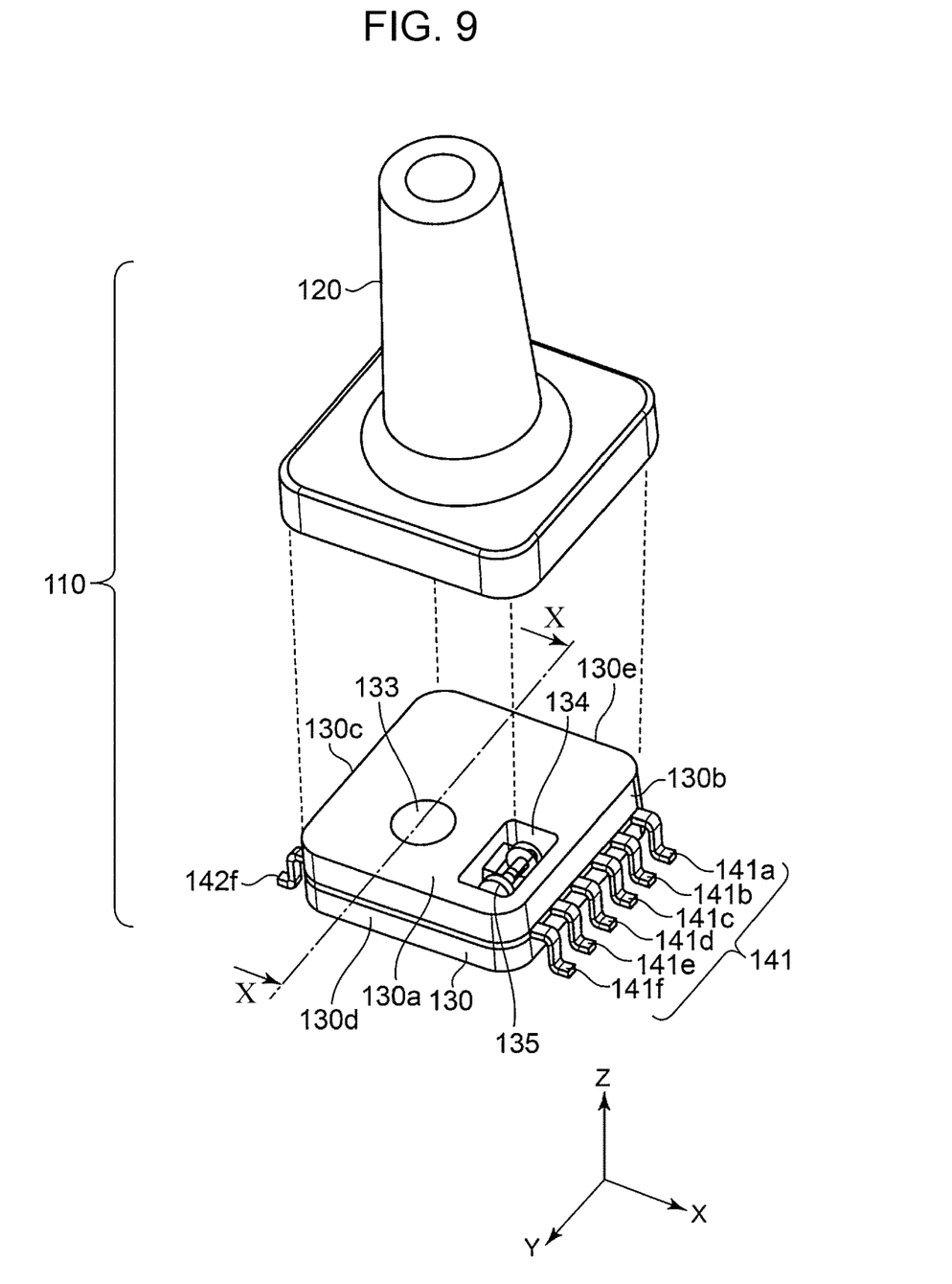
FIG. 9 is an exploded perspective view of the structure of the sensor package according to the second embodiment.
Figure 10:
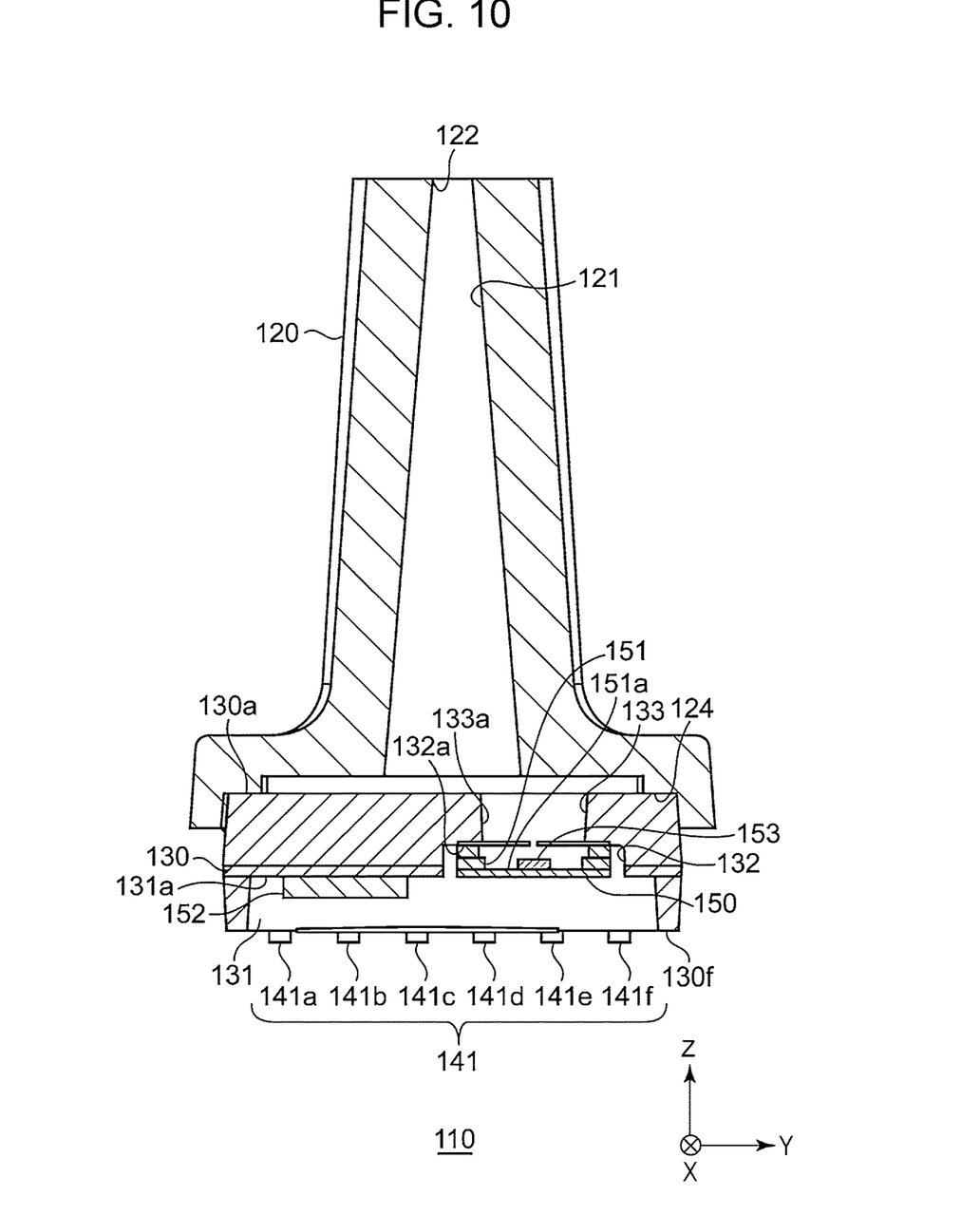
FIG. 10 is a sectional view of the structure of the sensor package according to an example embodiment.
Figure 11A:
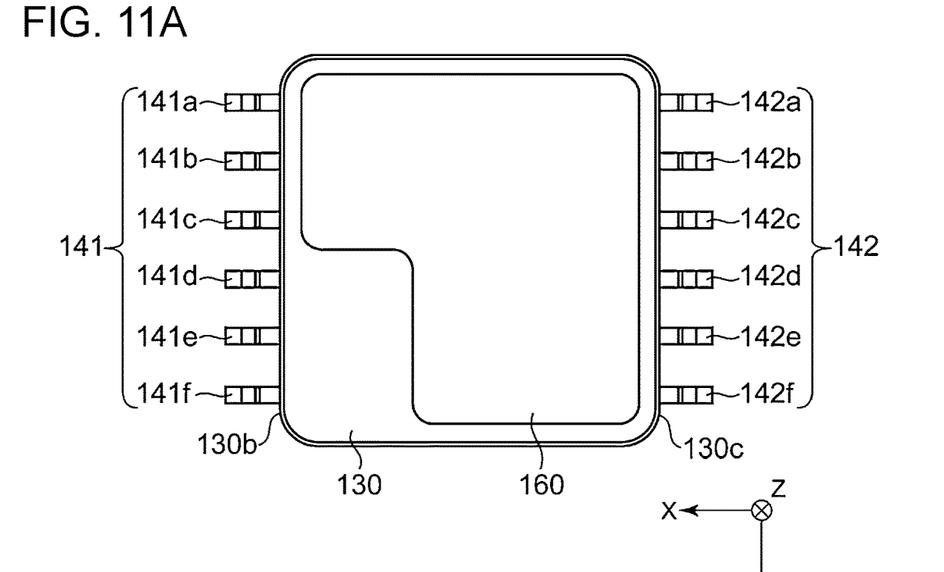
FIG. 11A is a bottom view of a structure of a main housing having been sealed.
Figure 11B:
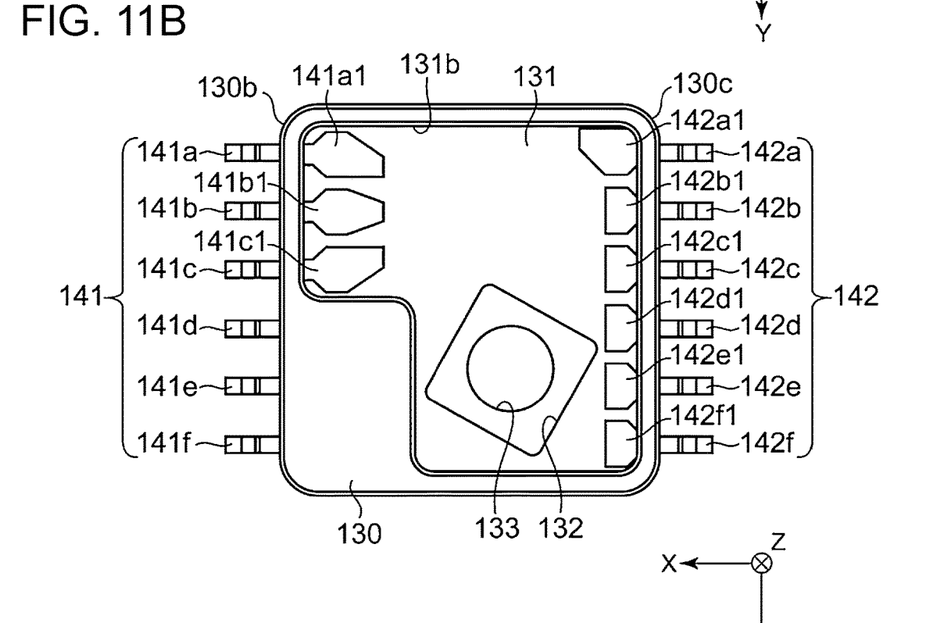
FIG. 11B is a bottom view of the structure of the main housing before the main housing is sealed and before a sensor housing and an integrated circuit (IC) board are disposed.
Figure 12:
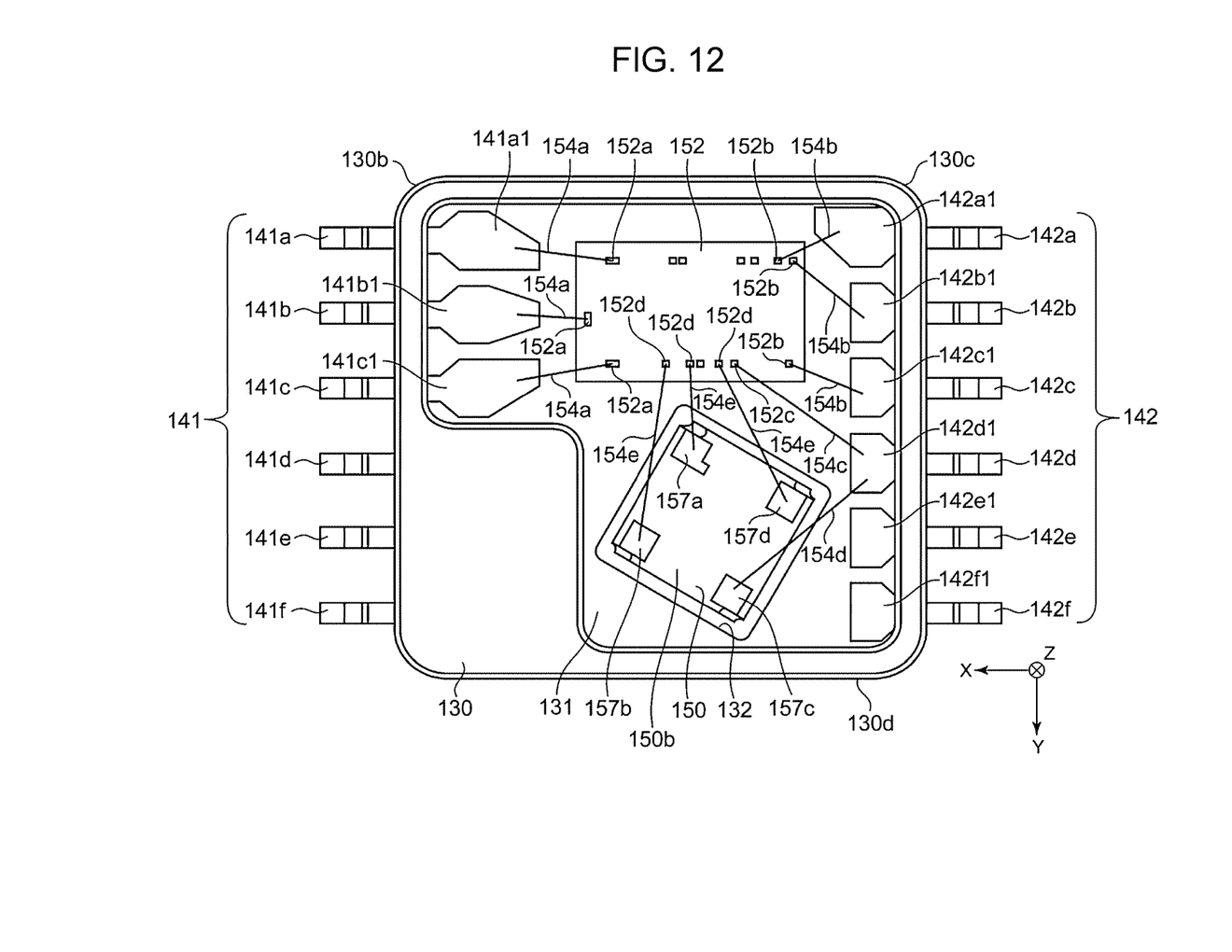
FIG. 12 is a bottom view of the structure of the main housing after the sensor housing and the IC board have been disposed and wire bonding has been performed and before the main housing is sealed.
Figure 13A:
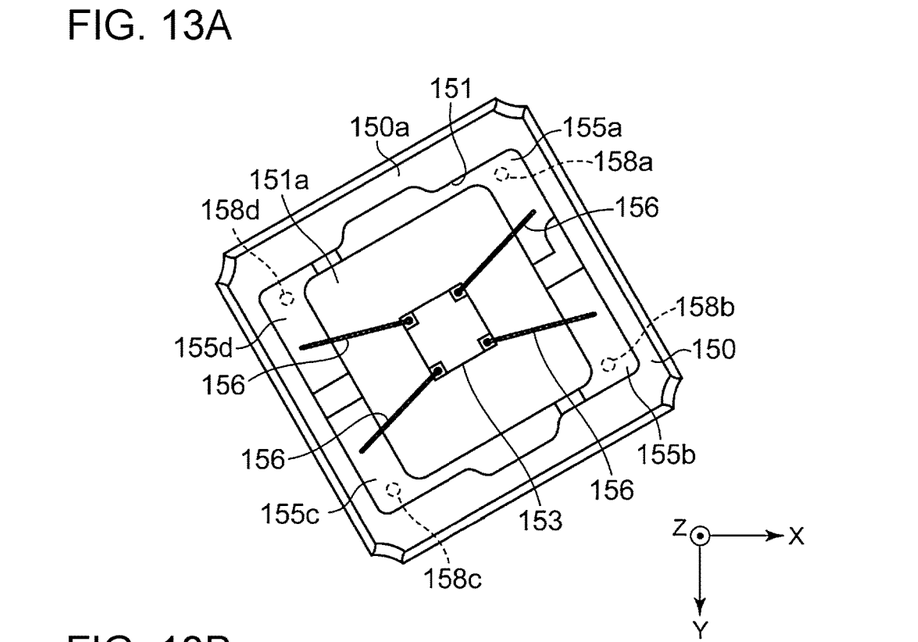
FIG. 13A is a plan view of a structure of the sensor housing.
Figure 13B:
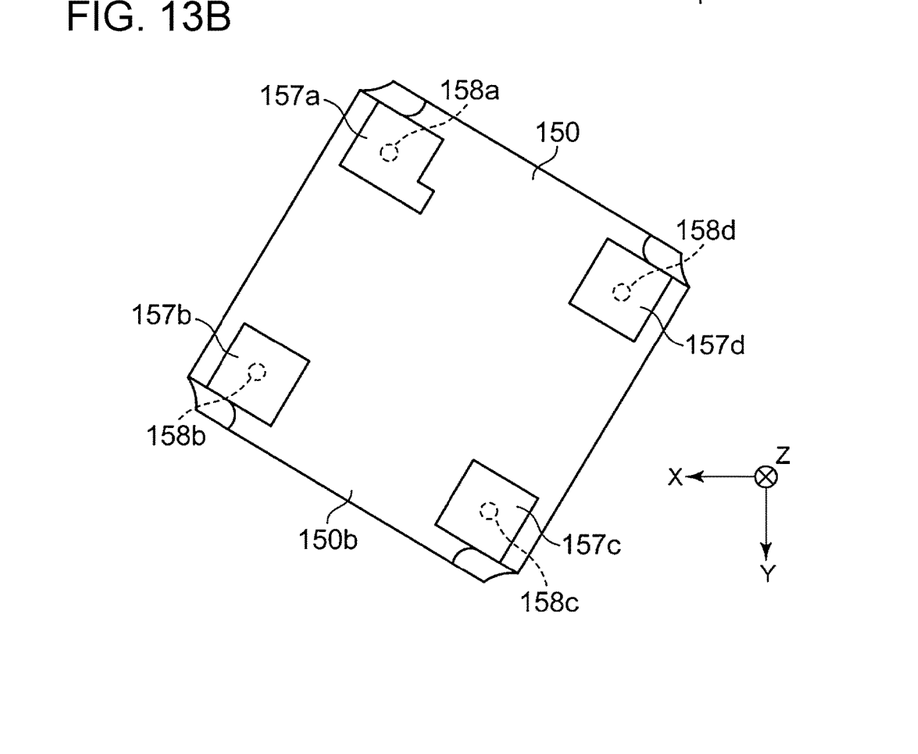
FIG. 13B is a bottom view of the structure of the sensor housing.

FIG. 8 is a perspective view of a structure of a sensor package 110. FIG. 9 is an exploded perspective view of the structure of the sensor package 110. FIG. 10 is a sectional view of the structure of the sensor package 110 taken along line X-X of FIG. 9. FIG. 11A is a bottom view of a structure of a main housing 130 having been sealed. FIG. 11B is a bottom view of the structure of the main housing 130 before the main housing 130 is sealed and before a sensor housing 150 and an IC board 152 are disposed. FIG. 12 is a bottom view of the structure of the main housing 130 after the sensor housing 150 and the IC board 152 have been disposed and wire bonding has been performed and before the main housing 130 is sealed. FIG. 13A is a plan view of a structure of the sensor housing 150. FIG. 13B is a bottom view of the structure of the sensor housing 150. It is noted that illustration of bonding wires is omitted from FIG. 10.

As illustrated in FIG. 8 or 9, the sensor package 110 may include a nozzle 120, the main housing 130, and lead frames 141 and 142 that extend outward from the main housing 130.

The nozzle 120 may be formed of a material that is the same as or similar to the material of the above-described nozzle 20, and the nozzle 20 may extend from the main housing 130 in the upward direction (Z direction). As illustrated in FIG. 10, the nozzle 120 may have a pressure introduction hole 121 therein. An opening 122 may be provided on an upper portion of the pressure introduction hole 121. An inner diameter of the pressure introduction hole 121 increases toward the lower side. The nozzle 120 may have a lower surface in which a fitting recess 124 into which the main housing 130 is fitted is formed.

The main housing 130 may be formed of a material that is the same or similar to the material of the nozzle 120. The main housing 130 may have a substantially rectangular shape in plan view. As illustrated in FIGS. 10, 11B, and 12, the main housing 130 may have a recess 131 formed in a lower surface 130*f*, which faces an upper surface 130*a*, so as to be recessed in the upward direction (Z direction). In this recess 131, a housing receiving space 132, which is recessed further in the upward direction from the recess 131, may be formed. The housing receiving space 132 may be formed on a side wall 130*d* side, the side wall 130*d* being one of side walls in the Y direction. A potting hole 133, which penetrates from the upper surface 130*a* of the main housing 130 to the housing receiving space 132, may be formed on the upper side of the housing receiving space 132. As illustrated in FIG. 10, the sensor housing 150 is disposed in the housing receiving space 132. The sensor housing 150 may have an inner space 151 which is recessed downward. The sensor housing 150 may be disposed so that, with respect to the potting hole 133 in the XY plane, a lower opening 133a of the potting hole 133 is covered with the sensor housing 150. In addition, the sensor housing 150 may be disposed so that, with respect to the potting hole 133 in the XY plane, the lower opening 133a of the potting hole 133 is received within a range corresponding to the inner space 151. A pressure sensor 153 may be disposed in the inner space 151. In this structure, the potting hole 133 and the inner space 151 communicate with each other so as to form a space closed to the recess 131. A pressure transmission medium (for example, fluorocarbon gel) may be poured from the opening 122 of the nozzle 120 into this space by potting, thereby the inner space 151 of the sensor housing 150 is filled with the pressure transmission medium flowing thereinto through the potting hole 133, and accordingly, the pressure sensor 153 is covered with the pressure transmission medium.

As illustrated in FIG. 9, a sensor receiving recess 134, which is recessed downward, may be formed at a position in the upper surface 130a of the main housing 130 closer to a side wall 130b than the potting hole 133 in the X direction. The sensor receiving recess 134 may be a bottomed space that does not reach the recess 131. A temperature sensor 135 may be disposed in the sensor receiving recess 134. The sensor receiving recess 134 also may be filled with the pressure transmission medium that is poured from the opening 122 of the nozzle 120 into the sensor receiving recess 134 by potting. Thus, the temperature sensor 135 is covered with the pressure transmission medium.

Leads included in the lead frames 141 and 142 may be formed of a material that is the same as or similar to the material of the leads 41, 42, 43, and 44 of the first embodiment.

The lead frame 141 may include six leads 141a, 141b, 141c, 141d, 141e, and 141f, which are disposed by insert molding so as to extend outward in the X direction from the side wall 130b of the main housing 130. As illustrated in FIG. 12, tip portions 141a1, 141b1, and 141c1 of the leads 141a, 141b, and 141c are exposed in the recess 131 and electrically connected to corresponding pads 152a of the IC board 152 by metal bonding wires 154a.

The lead frame 142 may include six leads 142a, 142b, 142c, 142d, 142e, and 142f, which are disposed by insert molding so as to extend outward in the X direction from a side wall 130c facing the side wall 130b. As illustrated in FIG. 12, tip portions 142a1, 142b1, 142c1, 142d1, 142e1, and 142f1 of the leads 142a, 142b, 142c, 142d, 142e, and 142f are exposed in the recess 131. Out of these, the tip portions 142a1, 142b1, and 142c1 are electrically connected to corresponding pads 152b of the IC board 152 by metal bonding wires 154b. Furthermore, the tip portion 142d1 is electrically connected to a pad 152c of the IC board 152 by a metal bonding wire 154c and also electrically connected to a pad 157c on a lower surface 150b of the sensor housing 150 by a metal bonding wire 154d.

The sensor housing 150 may be formed of a material that is the same as or similar to the material of the above-described sensor housing 50. The sensor housing 150 may be secured to an upper surface 132a that defines an upper end of the housing receiving space 132 by an adhesive (for example, epoxy resin). The material of the sensor housing 150 may have a higher Young's modulus than those of the main housing 130 and the adhesive used for securing in the housing receiving space 132. The sensor housing 150 also may have a substantially rectangular shape in plan view as illustrated in FIGS. 13A and 13B. The sensor housing 150 has the inner space 151 recessed inward in the Z direction at its central portion in the XY plane. In this inner space 151, the pressure sensor 153 may be secured to a lower surface 151a by a die bonding resin. The pressure sensor 153 may be electrically connected to pads 155a, 155b, 155c, and 155d provided in the inner space 151 by four bonding wires 156. The pads 155a, 155b, 155c, and 155d are respectively electrically connected to pads 157a, 157b, 157c, and 157d provided on the lower surface 150b by using through holes 158a, 158b, 158c, and 158d (holes) that penetrate through the sensor housing 150 in the thickness direction. The through holes 158a, 158b, 158c, and 158d may be filled with an electrically conductive material (for example, tungsten or molybdenum), thereby conductive paths are formed. As illustrated in FIG. 12, the pads 157a, 157b, and 157d may be electrically connected to corresponding pads 152d of the IC board 152 by metal bonding wires 154e. As described above, the pads 157c is electrically connected to the tip portion 142d1 of the lead 142d by the bonding wire 154d. Here, the pads 152a, 152b, 152c, and 152d of the IC board 152 and the pads 155a, 155b, 155c, 155d, 157a, 157b, 157c, and 157d of the sensor housing 150 are formed of an electrically conductive material (for example, gold).

The structure of the pressure sensor 153 may be the same as or similar to that of the above-described pressure sensor 53. That is, when the pressure of the pressure transmission medium (for example, fluorocarbon gel) in the pressure introduction hole 121 varies, the pressure of the pressure transmission medium in the potting hole 133 and the inner space 151 communicating with the pressure introduction hole 121 varies, thereby the pressure applied to a diaphragm of the pressure sensor 153 varies. Accordingly, by detecting this pressure, the pressure of, for example, a liquid in a tube connected to the nozzle 120 can be detected.

As illustrated in FIG. 12, the IC board 152 may be disposed closer to a side wall 130e than the housing receiving space 132 in the recess 131 of the main housing 130. The IC board 152 may be, as illustrated in FIG. 10, secured to an upper surface 131a defining the recess 131 by the die bonding resin. The IC board 152 includes a computation unit that performs computation to create data for digital output in accordance with current or voltage that represents a result of detection output from the pressure sensor 153. Furthermore, the temperature sensor 135 may be electrically connected to the IC board 152 through a connecting device (not illustrated). In accordance with a result of detection performed by the temperature sensor 135, the IC board 152 corrects the result of detection performed by the pressure sensor 153 using a correction table stored in a memory (not illustrated) in advance.

In the recess 131, the sensor housing 150 and the IC board 152 may be disposed as described above and wire bonding is performed with the bonding wires (metal wires) 154a, 154b, 154c, 154d, and 154e. After that, the recess 131 may be filled with a sealant 160 from an opening 131b side located on the lower side so as to cover the sensor housing 150, the IC board 152, and the bonding wires 154a, 154b, 154c, 154d, and 154e (FIGS. 11A and 11B). The sealant 160 may be a resin material having insulating properties. This resin material may have a higher Young's modulus than that of the pressure transmission medium. Examples of the sealant 160 include, for example, epoxy resin or fluoroelastomer.

According to such an embodiment, the IC board 152 may be disposed outside the sensor housing 150. Thus, the size of the sensor housing 150 can be further reduced. Accordingly, flexibility for arrangement of the sensor housing 150 and the IC board 152 can be increased. Furthermore, even when a fluid as an object to be measured has electrification characteristics, due to disposition of the IC board 152 outside the sensor housing 150, there is no accumulation of charge on the surface of the IC board 152 through the pressure transmission medium (gel). Thus, electrostatic damage to the IC board 152 can be suppressed. Furthermore, the bonding wires that electrically connect the IC board 152 and the pressure sensor 153 to each other are not on a path through which pressure is transmitted and are covered with resin having a high Young's modulus. Thus, compared to the sensor package 10 of the first embodiment, there is no possibility of breakage of the bonding wires due to stress caused by transmission of the pressure by the pressure transmission medium, and accordingly, reliability of electrical connection can be improved.

For calibration of the pressure sensor 153, with electrically conductive plates provided on the calibration device side corresponding to the pads 157a, 157b, 157c, and 157d of the sensor housing 150, output from the pressure sensor 153 can be received.

Other operations, effects, and variants are the same as or similar to those described above.

Although the present disclosure has been described with reference to the above-described embodiments, the present invention is not limited to the above-described embodiments and may be improved or changed without departing from the purpose for improvement or the gist of the present invention.

As has been described, the sensor package according to the present invention is useful for pressure detection in automobiles, industrial machines, and so forth. Accordingly, the embodiments of the present inventions are not to be limited in scope by the specific embodiments described herein. Further, although some of the embodiments of the present disclosure have been described herein in the context of a particular implementation in a particular environment for a particular purpose, those of ordinary skill in the art should recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein. While the foregoing description includes many details and specificities, it is to be understood that these have been included for purposes of explanation only, and are not to be interpreted as limitations of the invention. Many modifications to the embodiments described above can be made without departing from the spirit and scope of the invention.

What is claimed is:

1. A sensor package comprising:
   a pressure sensor;
   a computation unit that performs specified computation in accordance with a result of detection performed by the pressure sensor;
   a lead frame through which a result of computation performed by the computation unit is output to an outside;
   a main housing that is formed of resin and that holds the lead frame; and
   a sensor housing that is formed of ceramic and that has an inner space in which the pressure sensor is disposed,
   wherein the pressure sensor is disposed in the main housing using the sensor housing.

2. The sensor package according to claim 1, further comprising:
   an integrated circuit board that includes the computation unit and that is disposed in the inner space of the sensor housing.

3. The sensor package according to claim 2,
   wherein the integrated circuit board and the lead frame are electrically connected to each other through a connection disposed in a hole that penetrates through the sensor housing.

4. The sensor package according to claim 3,
   wherein at least part of the sensor housing is disposed on the lead frame.

5. The sensor package according to claim 1, further comprising:
   an integrated circuit board that includes the computation unit and that is disposed at a position which is outside the sensor housing and in the main housing.

6. The sensor package according to claim 5,
   wherein the main housing has one surface having a recess, another surface facing the one surface, and a through hole that penetrates from the other surface to the recess,
   wherein the sensor housing covers a region where the through hole is connected to the recess, and the through hole and the inner space of the sensor housing communicate with each other so as to form a space closed to the recess, and
   wherein the integrated circuit board is disposed at a position which is in the recess and outside the sensor housing.

7. The sensor package according to claim 6,
   wherein the through hole and the inner space are filled with a pressure transmission medium, and the pressure sensor disposed in the inner space is covered with the pressure transmission medium, and
   wherein the recess is filled with a resin having a higher Young's modulus than a Young's modulus of the pressure transmission medium, and the integrated circuit board is covered with the resin having the higher Young's modulus than a Young's modulus of the pressure transmission medium.

8. The sensor package according to claim 7, further comprising:
   a metal wire that connects the integrated circuit board and a pad provided on a lower surface of the sensor housing to each other,
   wherein the integrated circuit board and the pressure sensor are electrically connected to each other through the metal wire, and the metal wire is covered with the resin having the higher Young's modulus than the Young's modulus of the pressure transmission medium.

9. The sensor package according to claim 8,
   wherein the pressure sensor and the pad are electrically connected to each other through a connection disposed in a hole that penetrates through the sensor housing.

10. The sensor package according to claim 1, further comprising:
    a material that has a lower Young's modulus than a Young's modulus of the sensor housing and that is disposed between the main housing and the sensor housing.

* * * * *